United States Patent

Harnett et al.

[11] Patent Number: 5,654,512
[45] Date of Patent: Aug. 5, 1997

[54] FLEXIBLE MEMBRANE VARIABLE ORIFICE FLUID FLOW METER

[75] Inventors: Sean O. Harnett; Ronald E. Chasteen; Gregory Dean Troutman, all of Washington, Mo.

[73] Assignee: Pacer Industries, Inc., Pensacola, Fla.

[21] Appl. No.: 488,842

[22] Filed: Jun. 9, 1995

[51] Int. Cl.⁶ .................................................. G01F 1/34
[52] U.S. Cl. .................................... 73/861.53; 73/715
[58] Field of Search .................... 73/861.47, 861.52, 73/861.53, 715, 716, 717, 723

[56] References Cited

U.S. PATENT DOCUMENTS

| | | | |
|---|---|---|---|
| 3,485,104 | 12/1969 | Sanford | 73/716 |
| 4,729,244 | 3/1988 | Furuse | 73/861.53 |
| 5,033,312 | 7/1991 | Stupecky | 73/861.53 |
| 5,038,621 | 8/1991 | Stupecky | 73/861.53 |

*Primary Examiner*—Richard Chilcot
*Assistant Examiner*—Harshad Patel
*Attorney, Agent, or Firm*—Richard W. Hanes

[57] ABSTRACT

A flexible membrane variable orifice fluid flow meter which comprises a body, having a fluid conducting passageway therethrough, where the passageway has a first lateral width and second lateral width, and where the second lateral width is greater than the first, a backing bracket having a flat underside disposed within the second lateral width portion of the passageway perpendicularly to the direction of fluid flow and positioned so as to be superimposed over the first lateral width portion of the passageway, where the backing bracket has a lateral width less than the second lateral width but greater than the first lateral width of the passageway, a flexible membrane having head and toe ends, disposed between the flat underside of the backing bracket and the first lateral width portion of the passageway, and secured at its head end between the backing bracket and the body so that under conditions of zero fluid flow rate, the membrane obstructs the passageway across the second lateral width thereof, and differential pressure sensing ports disposed respectively in the first and second width portions of the passageway.

3 Claims, 2 Drawing Sheets

FLEXIBLE MEMBRANE VARIABLE ORIFICE FLUID FLOW METER

The present invention relates generally to measurement of fluid flow and more particularly to that type of such device known as an orifice meter.

BACKGROUND

Orifice meters, using piezometric methods to determine the differential head across a fixed orifice a conduit though which a fluid flows are well known in the prior art. A fixed orifice flow meter, however, has a very narrow range of flow rates over which accuracy of measurement can be maintained. If the orifice is small enough to provide good resolution of head differentials at low flow rates, the orifice will restrict much higher flow rates and produce erroneous high flow rate measurement. On the other hand, if the orifice is large enough to accommodate large flow rates there will be poor resolution of pressure differentials at low flow rates and consequent inaccurate measurements.

It is therefore the primary object of the present invention to provide a variable area orifice associated with the generation of differential pressure signal for use as a fluid flow meter.

A second objective of the invention is provide flow measuring apparatus having substantial pressure differentials across the measuring orifice for a wide range of rates of flow in order to achieve accurate measurements at both high and low flow rates.

THE DRAWINGS

FIG. 1 is a longitudinal cross sectional view of the flow meter of the present invention, taken along lines 1—1 of FIG. 3, showing an input body and a superimposed output body the variable orifice device of the present invention interposed therebetween. The membrane of the variable orifice device is shown in a fluid flow state where the flowing fluid pressure is sufficient to flex the membrane into a bow shape, as shown.

DETAILED DESCRIPTION

Figure 1:
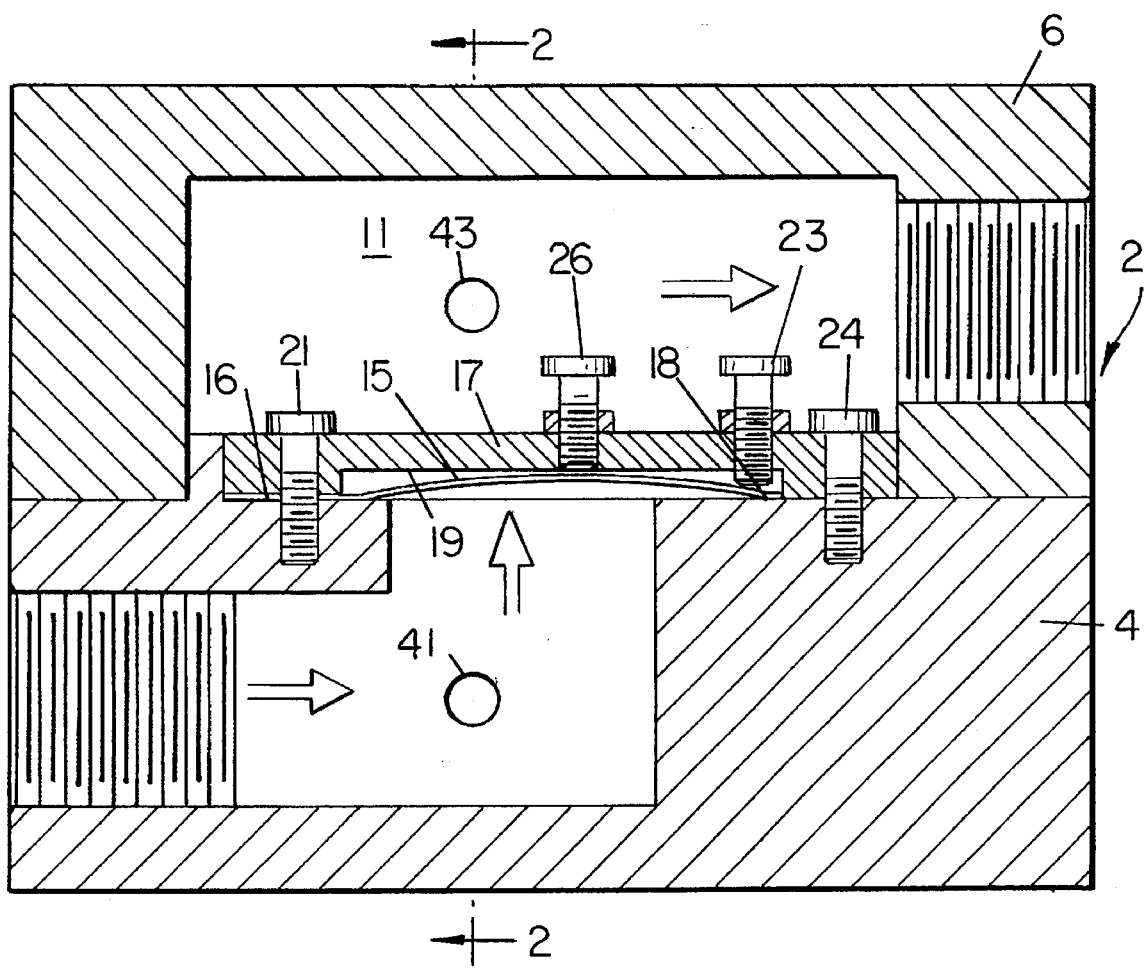
Figure 2:
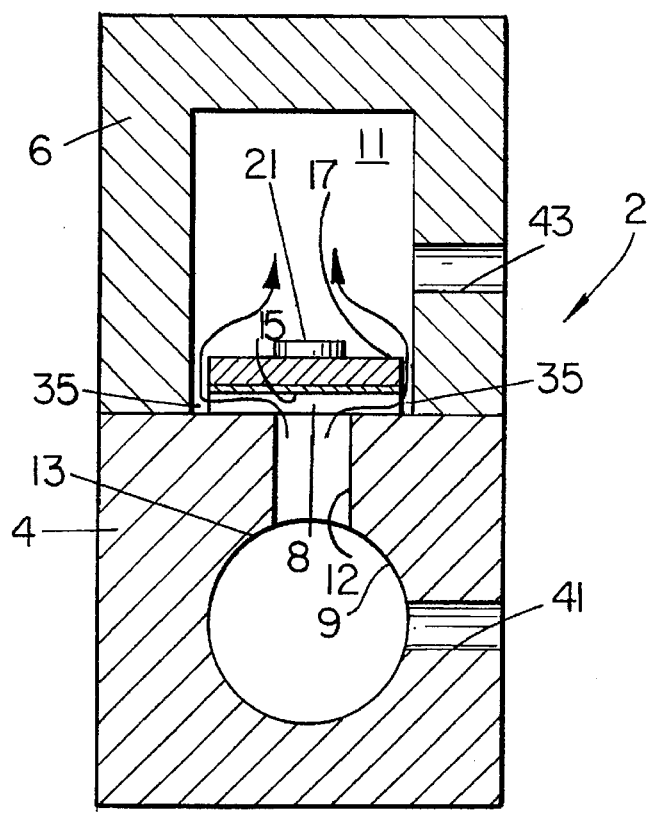
FIG. 2 is a cross sectional view taken along lines 2—2 of FIG. 1.
Figure 3:
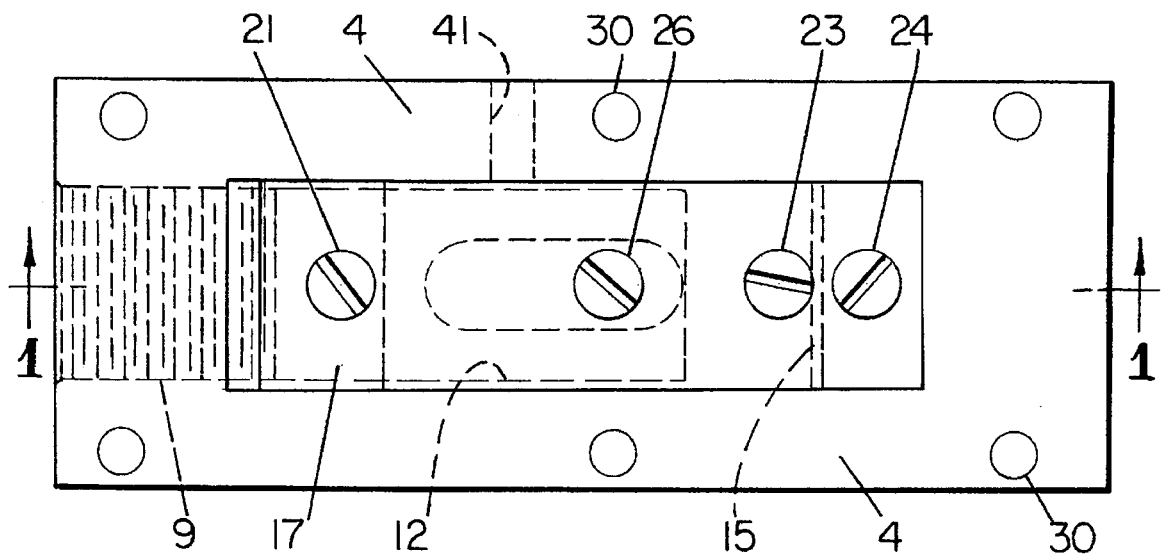
FIG. 3 is a top view of the input body and the attached backing plate which secures a flexible membrane to cover an opening in the top of the input body.

In the preferred embodiment of the invention the flowmeter 2 comprises a body having a bottom half 4 and a superimposed upper half 6. A fluid carrying passageway traverses the bottom and top halves of the body with variable orifice 8 in the passageway. The flow direction of the fluid through the meter 2 is indicated by the large arrows within the main fluid conduits 9 and 11. The fluid being measured can be either in the liquid or gaseous phase.

Referring now to the drawings, and initially to FIG. 1 thereof, the bottom half 4 of the body of the flow meter comprises a solid block structure having a bore 9 threaded at its entry end for receiving a mating threaded end of a fluid conducting pipe or conduit (not shown). The bore 9 terminates in an aperture 12 in the ceiling 13 of the bore 9. The aperture 12 is, by the apparatus of this invention, transformed into a variable area orifice by the pressure responsive movement of a normally flat, flexible membrane, or reed, 15 which is positioned to cover the aperture 12 when fluid flow pressure is not present. In the preferred form of the invention, the membrane 15 is elongated in its shape, having head and toe ends. The head end 16 of the membrane 15 is clamped in place between the bottom half of the body 4 and a first end of a backing bracket 17. The bracket has a relieved center portion 19 on its flat underside into which the membrane may rise, bow or flex, when exposed to flowing fluid pressure from its underside, that is the side next to the aperture. The first end of the backing bracket is attached to the bottom half 4 by a screw or similar fastener 21, which, together with screw fastener 24 at its second end, holds the backing bracket 17 to the bottom half 4. The toe end 18 of the membrane, on the other side of the aperture 12 from its head end 16, is relatively free, being constrained only against vertical movement beyond a selective limit by the lower end of a low flow adjustment bolt 23. The bolt 23 is threaded into and carried by the backing bracket and is positioned over the toe end 18 of the membrane 15. A maximum flow adjustment bolt 26 is also threaded through and carried by the backing bracket 17. It is positioned over the membrane 15 at a location along the length of the membrane which is over the aperture 12. In operation, the quiescent, or no fluid pressure, position of the membrane is to lie flat against the surface surrounding the aperture 12, effectively closing the aperture. When fluid pressure is first felt in the bore 9 the toe end 18 of the membrane is lifted off of the surface, creating a space around the sides of the membrane through which the fluid can flow from the aperture 12. However, the toe end of the membrane can lift away from the apertured surface only until it comes in contact with the low flow adjustment bolt 23. The area of opening of the orifice at the position when the membrane first contacts the low flow adjustment bolt defines the area of the smallest orifice in the range of orifice sizes to be allowed by the device of the present invention. As inflowing fluid pressure continues to increase in the bore 9 the membrane begins to flex in its center portion, both ends being restrained against further upward motion. The purpose of the maximum flow adjustment bolt 26 is to limit the bend or flex of the membrane, as shown in FIG. 1, in order to establish a maximum orifice size for the flow meter.

The output portion 6 of the flow meter body contains an interior portion 11 which communicates through a threaded coupling with a fluid output pipe or conduit (not shown). In the embodiment shown, the upper half 6 of the body is sized and dimensioned to fit onto the top surface of the bottom half 4 of the body and be secured thereto by a series of bolts 30. In an alternative embodiment, a body containing the input and output passages 9 and 11 could obviously be a single piece. The side walls 32 and 33 of the interior cavity 11 in the upper half 6 of the body are dimensioned so that fluid passage spaces 35 exist between those side walls and the sides of the membrane and its overlying backing bracket.

A fluid input pressure measuring port 41 located in the bore 9 of the bottom half 4 measures the pressure of the input fluid in a customary manner. Similarly, a fluid output pressure measuring port 43 is located in the cavity 11 of the upper half 6 for measuring the pressure of the output fluid. These fluid pressures are communicated to a differential pressure measuring device, known in the prior art (not shown). The pressure drop across the variable orifice structure 8, as measured by the differential pressure measuring apparatus, is, with other known factors, determinative of the rate of fluid flow through the aperture 12, in accordance with known fluid flow measuring principles.

In operation, the objects of this invention are accomplished by the flexing of the membrane 15, as a function of the fluid pressure changes, to vary the size of the fixed aperture 12 from a minimum to a maximum sized effective orifice. When the membrane 15 is not subject to fluid pressure, it lies flat against the top surface of the bottom half 4 and covers the aperture 12. As the input fluid pressure becomes effective, the free toe end of the membrane 15 will lift off the bottom half 4 until the toe end contacts the low flow adjustment screw 23 and upon application of greater pressure the membrane will bow accordingly, uncovering a greater area of the aperture 12 and increasing the effective size of the orifice. As the membrane flexes upwardly the aperture 12 will increasingly lose its cover and fluid will pass through the aperture and bilaterally around the sides of the membrane into the spaces 35 and then into the output cavity 11. In this structure the orifice is actually defined as the area of the aperture 12, reduced to the area of the bilateral openings between the flexed membrane and the top surface of the bottom half 4. Thus for maximum flows, where the fluid pressure is greatest, the orifice will present its maximum area and the pressure drop across the orifice will be smaller. When flow rates and fluid pressure are low the combination of the membrane and the aperture 12 will present a smaller area orifice, providing a larger pressure drop thereacross.

While the preferred form of the invention has been described in terms of a flow meter body having fluid conducting conduits or cavities therein, it is well within the scope and intent of the invention that the variable orifice device could be as simple as a body having an opening and a covering membrane which is insertable as a unit into a fluid passageway. The body is sealed within the passageway so that flowing fluid can pass only through the opening in the body. Pressure differential sensing apparatus would then be arranged to sense the pressures in the fluid on both sides of the inserted body.

It is apparent from the foregoing description and the accompanying drawings that the orifice, across which the pressure drop is measured, is changed in its area to accommodate both low and high flows, in accordance with the objects of the invention. The membrane can be sized and adjusted by the low and maximum flow screws to provide good flow measurement results for a very wide range of flows. The construction is simple and cost effective and has a predictable temperature reaction that is easily compensated for.

We claim:

1. A variable orifice fluid flow meter, comprising, a body having first and second differentially laterally dimensioned fluid conduits therethrough and wherein the conduits are interconnected at a plane perpendicular to the direction of fluid flow, a backing bracket having a flat underside disposed within the second fluid conduit and over and parallel to the plane interconnecting with the first fluid conduit, wherein the backing bracket has a width less than the width of the second conduit and greater than the width of the first conduit, a flexible membrane having head and toe ends and disposed between the flat underside of the backing bracket and the first conduit and secured at its head end between the backing bracket and the body so that under conditions of zero fluid flow rate, the membrane obstructs the fluids flow through the first conduit, and differential pressure sensing means disposed respectively in the first and second fluid conduits.

2. The combination of claim 1 and further including, first adjustable abutment means carried by the backing bracket and positioned over the toe end of the membrane to selectively limit the distance which the toe end of the membrane can travel in the direction of the fluid flow.

3. The combination of claim 2 and further including, second adjustable abutment means carried by the backing bracket and positioned over the membrane intermediate its head and toe ends to selectively limit the distance which the central portion of the membrane can travel in the direction of the fluid flow.

* * * * *